United States Patent
Roberts et al.

(10) Patent No.: US 10,129,399 B1
(45) Date of Patent: *Nov. 13, 2018

(54) SYSTEMS AND METHODS FOR AUTOMATED CALL-HANDLING AND PROCESSING

(71) Applicant: Allstate Insurance Company, Northbrook, IL (US)

(72) Inventors: Clay F. Roberts, Gurnee, IL (US); Joseph D. Skala, Lake Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/499,065

(22) Filed: Apr. 27, 2017

Related U.S. Application Data

(63) Continuation of application No. 14/551,850, filed on Nov. 24, 2014, now Pat. No. 9,674,352, which is a continuation of application No. 13/947,550, filed on Jul. 22, 2013, now Pat. No. 8,923,506, which is a continuation of application No. 11/516,631, filed on Sep. 7, 2006, now Pat. No. 8,494,152.

(60) Provisional application No. 60/777,243, filed on Feb. 28, 2006.

(51) Int. Cl.
*H04M 5/00* (2006.01)
*H04M 3/493* (2006.01)
*G06F 17/30* (2006.01)
*G06N 5/02* (2006.01)

(52) U.S. Cl.
CPC ...... *H04M 3/493* (2013.01); *G06F 17/30312* (2013.01); *G06N 5/025* (2013.01); *H04M 2203/551* (2013.01); *H04M 2203/558* (2013.01)

(58) Field of Classification Search
CPC ............. H04M 3/5175; H04M 3/5191; H04M 2203/556; H04M 3/523; H04M 3/5232; H04M 3/5233; H04M 3/5235; H04M 3/4217; H04M 3/51; H04M 3/5141
USPC ............ 379/265.03, 265.06, 265.09, 265.12, 379/266.01
See application file for complete search history.

(56) References Cited

U.S. PATENT DOCUMENTS

| | | |
|---|---|---|
| 5,206,903 A | 4/1993 | Kohler et al. |
| 5,903,641 A | 5/1999 | Tonisson |
| 5,915,008 A | 6/1999 | Dulman |
| 5,999,609 A | 12/1999 | Nishimura |
| 5,999,965 A | 12/1999 | Kelly |
| 6,058,163 A | 5/2000 | Pattison et al. |
| 6,163,607 A | 12/2000 | Bogart et al. |
| 6,246,752 B1 | 6/2001 | Bscheider et al. |
| 6,252,946 B1 | 6/2001 | Glowny et al. |
| 6,574,605 B1 | 6/2003 | Sanders et al. |
| 6,597,783 B1 | 7/2003 | Tada et al. |
| 6,650,748 B1 | 11/2003 | Edwards et al. |
| 6,654,458 B1 | 11/2003 | Saleh |

(Continued)

*Primary Examiner* — Ahmad F Matar
*Assistant Examiner* — Kharye Pope
(74) *Attorney, Agent, or Firm* — Banner & Witcoff, Ltd.

(57) ABSTRACT

Methods, systems, and computer-readable media consistent with the present disclosure manage multiple telephone calls by managing a session record associated with the call, amending the session record according to a plurality of rules to reflect a plurality of instructed actions, evaluating an amended session record to derive at least one of the plurality of instructed actions, and implementing a derived instructed action on the call under the control of an automated apparatus.

20 Claims, 13 Drawing Sheets

(56) References Cited

U.S. PATENT DOCUMENTS

| | | |
|---|---|---|
| 6,661,882 B1 | 12/2003 | Muir et al. |
| 6,760,324 B1 | 7/2004 | Scott et al. |
| 6,778,647 B1 | 8/2004 | Dumas |
| 6,829,348 B1 | 12/2004 | Schroeder et al. |
| 6,978,247 B1 | 12/2005 | Bogart et al. |
| 7,003,079 B1 | 2/2006 | McCarthy et al. |
| 7,248,687 B2 | 7/2007 | Ambrose et al. |
| 7,411,939 B1 | 8/2008 | Lamb et al. |
| 7,715,546 B2 | 5/2010 | Pagel et al. |
| 7,949,121 B1 | 5/2011 | Flockhart et al. |
| 7,953,859 B1 | 5/2011 | Kiefhaber et al. |
| 8,116,446 B1 | 2/2012 | Kalavar |
| 2002/0032853 A1 | 3/2002 | Preston et al. |
| 2002/0075844 A1 | 6/2002 | Hagen |
| 2002/0090075 A1 | 7/2002 | Gabriel |
| 2002/0150231 A1 | 10/2002 | Hartmeier |
| 2002/0168055 A1 | 11/2002 | Crockett et al. |
| 2003/0002479 A1 | 1/2003 | Vortman et al. |
| 2003/0003988 A1 | 1/2003 | Walker et al. |
| 2003/0018702 A1 | 1/2003 | Broughton et al. |
| 2003/0080130 A1 | 5/2003 | Goetz et al. |
| 2003/0086554 A1 | 5/2003 | Krimstock et al. |
| 2003/0086557 A1 | 5/2003 | Shambaugh et al. |
| 2003/0123641 A1 | 7/2003 | Alvarado et al. |
| 2004/0001580 A1 | 1/2004 | Mason |
| 2004/0141508 A1 | 7/2004 | Schoeneberger et al. |
| 2004/0176973 A1 | 9/2004 | Lapeze et al. |
| 2004/0179672 A1 | 9/2004 | Pagel et al. |
| 2004/0208307 A1 | 10/2004 | Walker et al. |
| 2004/0218751 A1 | 11/2004 | Colson et al. |
| 2004/0228469 A1 | 11/2004 | Andrews et al. |
| 2004/0249650 A1 | 12/2004 | Freedman et al. |
| 2004/0264677 A1 | 12/2004 | Horvitz et al. |
| 2005/0009502 A1 | 1/2005 | Little et al. |
| 2005/0027536 A1 | 2/2005 | Matos et al. |
| 2005/0038696 A1 | 2/2005 | Kalevik et al. |
| 2005/0041793 A1 | 2/2005 | Fulton et al. |
| 2005/0069102 A1 | 3/2005 | Chang |
| 2005/0083915 A1 | 4/2005 | Mathew et al. |
| 2006/0067506 A1 | 3/2006 | Flockhart et al. |
| 2006/0190422 A1 | 8/2006 | Beale et al. |
| 2006/0227957 A1 | 10/2006 | Dolan et al. |
| 2006/0245576 A1 | 11/2006 | Henry |
| 2006/0256951 A1 | 11/2006 | Rodenbusch et al. |
| 2006/0262922 A1 | 11/2006 | Margulies et al. |
| 2006/0285665 A1 | 12/2006 | Wasserblat et al. |
| 2007/0036331 A1 | 2/2007 | Fitzgerald |
| 2007/0121897 A1 | 5/2007 | Patakula et al. |
| 2008/0034354 A1 | 2/2008 | Brughton et al. |
| 2008/0095355 A1 | 4/2008 | Mahalaha et al. |
| 2009/0003584 A1 | 1/2009 | Walker et al. |

| pkey | segment_id | VDN (DNIS) | VDN (monitor) | menu option | VDN (dest.) | EDU_id |
|---|---|---|---|---|---|---|
| zz123 | 1 | yy1 | yy1 | NULL | xy5 | xx456 |
| zz124 | 2 | yy2 | xy5 | 1 | xy8 | xx456 |
| zz125 | 3 | yy1 | xy8 | 1 | xy2 | xx456 |
| zz126 | 4 | yy1 | xy2 | 2 | yz3 | xx456 |
| zz127 | 1 | yy2 | yy2 | NULL | xy6 | xx478 |
| zz128 | 2 | yy2 | xy9 | NULL | yz5 | xx478 |

FIG. 10

| EDU_id | ANI | VDN (DNIS) | VDN (exl) | menu selection history |
|---|---|---|---|---|
| xx456 | zx4-mmm-nxx2 | yy1 | yz3 | 1, 1, 2 |
| xx378 | zy2-mmm-nxx7 | yy2 | yz5 | NULL |

FIG. 11

| pkey | VDN (DNIS) | VDN (monitor) | menu option | VDN (dest.) | | description |
|---|---|---|---|---|---|---|
| xw23 | yy1 | yz2 | 999 | xz6 | | Default from Spanish |
| xw24 | yy1 | yz2 | 1 | xz5 | | Transfer to CSR (Spanish) |
| xw25 | yy1 | yz2 | 0 | yz4 | | non-verbal (Spanish) |
| xr37 | yy1 | xy8 | 1 | xy2 | | Transfer to CSR |
| xr38 | yy1 | xy8 | 0 | yz3 | | non-verbal |
| xr39 | yy1 | xy5 | 999 | xy8 | | Default (English) |
| xr40 | yy1 | xy5 | 2 | yz2 | | Spanish prompts |
| xr41 | yy1 | xy5 | 1 | xy8 | | English prompts |
| xr42 | yy1 | yy1 | 999 | xy5 | | General ACME1 Greeting |
| xr43 | yy2 | xy8 | 999 | xy6 | | Default (Acme2) |
| xr44 | yy2 | xy9 | 1 | xz5 | | Location and Hours (Acme2) |

FIG. 12

SYSTEMS AND METHODS FOR AUTOMATED CALL-HANDLING AND PROCESSING

CROSS-REFERENCE TO RELATED APPLICATIONS

This application is a continuation of co-pending U.S. application Ser. No. 14/551,850, entitled "Systems and Methods for Automated Call-Handling and Processing," filed Nov. 24, 2014, which is a continuation of U.S. patent application Ser. No. 13/947,550 (now U.S. Pat. No. 8,923,506) entitled "Systems and Methods for Automated Call-Handling and Processing" and filed on Jul. 22, 2013, which is a continuation of U.S. patent application Ser. No. 11/516,631 entitled "Systems and Methods for Automated Call-Handling and Processing" and filed on Sep. 7, 2006 which issued as U.S. Pat. No. 8,494,152 on Jul. 23, 2013, which claims the benefit of U.S. Provisional Patent Application No. 60/777,243 entitled "Systems and Methods for Automated Call-Handling and Processing" and filed on Feb. 28, 2006, each of which are incorporated by reference in their entirety herein.

BACKGROUND

Companies typically provide telephone "call centers" or "contact centers" as a service to their customers. This is particularly so—though not exclusively so—when the company relies upon personalized service to their customers to generate real revenue, or to generate intangible value for the company, such as customer goodwill. For example, financial institutions, such as insurance companies, banks, mortgage companies, and credit card companies may provide telephone call centers with live operators for day-to-day matters. In addition, cable television companies may provide such centers for pay-per-view or other assistance, and other companies may provide centers for automated purchases, for technical assistance, for power outage assistance, for emergency assistance, for travel reservations, for student registration, for lotteries, for participation in television or radio game shows, etc.

The operation of one call center (including both automated and live capabilities) for the benefit of one company in one industry does not remain static. Changes to a call center involving system upgrades, improvements in call handling, interaction, management, processing, or routing are common. One of the parameters that tends to complicate changes is the 'size' of a call center, which, in turn, is generally a function of the number of anticipated calls.

Various technologies can form a part of a call center. For example, an "Automated Attendant" system is conventionally a system that connects to a PBX system, a Centrex system, or an Automatic Call Distributor ("ACD"), accepting incoming calls, providing audible prompts to callers, and accepting input from callers. As the name suggests, an Automated Attendant seeks to automate the functions of a live telephone operator (or "attendant").

Before the advent of modern call centers, a live switchboard operator would briefly answer calls by asking the caller who they wished to speak to or what department to be connected to. After the caller made his request, the live switchboard operator would route the call to the requested destination and drop off the line. In a similar manner, and with respect to the Automated Attendant systems discussed above, the input that is accepted by an Automated Attendant may be used to provide another prompt to the caller, terminate the call, or it may be used to allow the caller to self-route the call to some destination.

FIGS. 1-1 and 1-2 (collectively FIG. 1) depict an exemplary prior-art Automated Attendant system 140 connected to PBX 155. Automated Attendant system 140 includes Voice Node 144, Control Node 142, Database 145, and may include Reporting Engine 148. As will be discussed in more detail below, Reporting Engine 148 may be used to write to Call Log 150 and/or create a string of parameters associated with a particular call.

PBX 155 is also connected to customer service representative stations (CSR stations) 171, 172, and 179. Each of the CSR stations includes a workstation that may be connected over a Network 180 to Customer Database 190.

FIG. 2 depicts an exemplary call flow that the hardware in FIG. 1 may implement. A call from Remote Terminal 100 may be routed over PSTN 110 to PBX 155. When PBX 155 receives the call, it initially routes the call over Line 162 to Automated Attendant system 140. One manner in which this is accomplished is by Call Vectoring and Vector Directory Numbers (VDNs), as described, for example, in U.S. Pat. No. 5,206,903 to Kohler et al. The chosen VDN corresponds to the connection represented by Line 162 to Automated Attendant system 140 and a series of logical decisions carried out by Control Node 142. If Automated Attendant system 140 is integrated in PBX 155, then Line 162 may correspond to an internal bus line.

When Voice Node 144 receives the call, it may, under the control of Control Node 142, provide an audible message or prompt to the caller. In FIG. 2, for example, steps 200 and 205 include a general greeting (step 200) and a general introduction to certain menu options (step 205). Although the next step 210 is depicted as collecting DTMF data from the caller, Voice Node 144 may be programmed to continually test or be responsive to incoming DTMF singles, with corresponding responses available under the control of Control Node 142.

One of the simplest operations available, however, is to transfer the caller to the appropriate CSR. In FIG. 2, for example, should the caller enter DTMF tone "1" on the remote terminal, Control Node 142 is programmed to formulate a transfer operation to an agent in CSR group 1. This may be accomplished in a variety of ways. For example, if Line 162 represents an analog POTS line, Voice Node 144 may generate a "FLASH" signal, and then enter the appropriate command and extension that PBX 155 recognizes as a command to transfer the instant call to a particular extension. This may be accomplished, again, by VDNs. For example, under the "FLASH" transfer discussed above, Voice Node 144 may generate DTMF tones to tell PBX 155 to transfer the call to extension "1234." Moreover, as with incoming calls, PBX 155 may be programmed such that requests to reach extension "1234" get mapped to "VDN xx1," which corresponds in FIG. 1 to CSR station 171. The result is that the call no longer terminates on Automated Attendant system 140, but is transferred to an available CSR agent located at VDN xx1. Again, the "FLASH" transfer technique discussed above is only exemplary. If a digital connection is available, the command to pull the call from Automated Attendant system 140 and send it to VDN xx1 may be made through an out-of-band data connection.

Database 145, as depicted in FIG. 1 contains stored data, such as the audio files associated with the greetings, the prompts, and the messages. Control Node 142 includes the logic associated with the process of analyzing retrieved data over line 162 and determining the response Automated Attendant system 140 should make as a function of the assigned VDN.

As noted above, Reporting Engine 148 may be used to keep a log associated with the calls that Automated Attendant system 140 handles. Call Log 150 typically includes information associated with each call Automated Attendant system 140 handles, and may be used to index other associated data, such as the CSR group the call is transferred to.

As noted above, an Automated Attendant conventionally has the ability to provide prompts to callers, terminate calls, or allow callers to route the call to some destination. Conventionally, the motivation for the introduction of Automated Attendants was to automate the routine tasks generally performed by a live switchboard operator. Similarly, the traditional use of Automated Attendant systems is not to provide personalized information to callers. Rather, the traditional use of Automated Attendant systems has been to route the callers to a destination at which they can receive the personalized information they desire. In this regard, the most information that may traditionally be provided by an Automated Attendant is information about the telephone circuits themselves, such as the particular telephone extension number that the caller is routed to in a "Dial-by-Name" system.

However, because the operator of the Automated Attendant system may customize the prompt to callers, some Automated Attendant systems provide general information to all callers that call in. For example, an Automated Attendant system may be customized to provide all callers to a business with "Locations and Hours" information, or may be customized by a movie theater to provide movie schedules and costs. The assumption behind this use, however, is that everyone dialing into the telephone number connected to the Automated Attendant system is interested in the same or a similar class of information. While the most requested information may be how to connect to a particular live person that can address the caller's particular issue, it may also be used to provide generally anticipated information as, for example, "Locations and Hours," movie schedules and costs, etc.

An Automated Attendant system also has the ability to collect data from the caller or from the switch, such as the called number ("DNIS") or the calling number ("ANI"), or from some other source. U.S. Pat. No. 5,867,562 to Scherer, for example, describes some examples of network data. The Automated Attendant system may be programmed to collect such data in order to populate a computer screen for the agent the call is eventually routed to. The gathering of such data, associating it with a particular call, and using it to populate the computer screen in front of the agent as the call is switched to the agent is generally referred to as Computer Telephony Integration ("CTI"), and the particular operation is generally known as a "screen pop." FIG. 3 depicts an illustration of how such a process may be achieved using the system of FIG. 1.

Considering, again, the system of FIG. 1, PBX 155 is connected to CSR stations 171, 172, and 179, which are configured to provide the respective agents with screen pops. Each of the CSR stations includes a workstation that may be connected over a Network 180 to Customer Database 190, and is also connected to CTI Manager 160.

Also represented in FIG. 1 is the use of Data Set 146 and Data Set 147 in Database 145. Whereas FIG. 2 illustrated the possible use of one greeting and set of menu prompts, and responses, FIG. 1 depicts the availability of at least two separate sets of greetings, menu prompts, and responses, each associated with a particular DNIS/VDN that Automated Attendant system 140 receives from PBX 155 or from a switch. For example, Data Set 146 is depicted as associated with VDN yy2, and Data Set 147 is depicted as associated with VDN yy1. Again, the illustration is exemplary only. While the greetings, prompts, and messages are depicted as separately stored, the two data sets may equally include data that is common to both, such as a routine message: "please stay on the line while your call is transferred."

The DNIS that PBX 155 associates with VDN yy1 may be derived from one published number, and the DNIS that PBX 155 associates with VDN yy2 may be derived from another published number. Moreover, the first number may be published for callers to make purchases, while the other number may be published for callers to make service calls. In this sense, the same Automated Attendant system 140 is configured to handle both sets of calls, and Control Node 142 is simply programmed, based upon the DNIS\VDN number, to pull the appropriate data from Database 145, and make the appropriate call flow decisions.

FIG. 3 depicts a process of a screen pop by the system of FIG. 1. The numbers "1," "2," "3," "4," etc. in FIG. 3 indicate the order in which the process may be executed. As before, a call from Remote Terminal 100 may be routed over PSTN 110 to PBX 155. When PBX 155 receives the call, it may be programmed to connect the call initially over Line 162 to Automated Attendant system 140 using VDN yy1.

When Voice Node 144 receives the call with the associated VDN number, it may, under the control of Control Node 142, provide an audible message or prompt to the caller, and Reporting Engine 148 may write to Call Log 150. In FIG. 3, this process is indicated by the lines labeled "1-6" flowing from PBX 155 to Telephony Server 310 contained within Automated Attendant system 140, between Telephony Server 310 and Call Process Engine 320, between Call Process Engine 320 and Reporting Engine 148, and between Reporting Engine 148 and Call Log 150. In FIG. 3, one skilled in the art should appreciate that Telephony Server 310 and Call Process Engine 320 represent functional modules. Such modules are depicted in this manner merely to schematically isolate functions that are performed by the combination, depicted in FIG. 1, of Voice Node 144, Control Node 142, and Database 145 in Automated Attendant system 140. Such processes and functions, as indicated above, may include a general greeting, a general introduction to certain menu options, the capture of a DTMF signal, and the determination as to what extension (or VDN) PBX 155 should route the call to.

If the system of FIG. 1, based upon the internal vectoring logic, determines that a call should be routed to an available CSR agent associated with a VDN (such as at CSR station 171), then Reporting Engine 148 generates CTI_id 152, and Call Process Engine 320 instructs Telephony Server 310 to send the appropriate command to PBX 155 to route both the call to the VDN, as well as a data value containing the CTI_id 152, such as "zz4." CSR station 171 then receives the transferred call and the CTI_id data (either in-band or out-of-band). The arrow labeled "7" depicts this. The CTI_id, then, may be transmitted to Web Browser (or Thick Client) 384 (which is residing on the workstation located at CSR Station 171) in the process arrow "8." Web Browser (or Thick Client) 384 then may be programmed to generate a URL including the CTI_id in a request to CTI Manager 160 in order to retrieve any other data associated with the call and located in Call Log 150 (process arrows 9-12). Such additional information then may be sent back to Web Browser (or Thick Client) 384, which may include information (such as ANI information) identifying who the caller is. With this information, the web browser (or thick client) may be programmed to generate a request for customer data that accesses the Customer Database 190 and retrieve the appropriate customer information (process arrows 13 and 14). In this way, as the CSR agent is preparing to speak with the caller on the line, the CSR agent's compute screen may be already populated with the appropriate information, as well as having pulled the customer's data record from the customer database. U.S. Pat. No. 6,934,381 to Klein et al., for example, discloses a system for routing calls to CSRs based upon how the customer contact was received (i.e., Voice over PSTN, e-mail, text chat, VOIP, etc).

As indicated above, a live customer service representative at a call center generally provides personalized service for callers. Even this function, however, has been found over time to involve responses to similar or redundant requests. For example, while many customers dialing into a bank may want to know the bank's location and hours, many more customers dialing into a bank generally want to know what their current balance is. In this regard, however, while "location and hours" information will apply to all callers dialing into a system, a callers' current balance will, by definition, not apply to all callers, but be personal to the particular caller dialing in.

In order to automate such redundant personalized customer requests, Interactive Voice Response systems ("VRs") were developed. IVRs may be generally thought of as a computer with an audio-based interface. Traditionally, an IVR system will provide the caller with audible prompts, and accept DTMF input in response to the prompts. IVRs may be distinguished from Automated Attendant systems, however, in that they are configured to particularly respond to a caller's request for personalized information. This, generally, will involve access to a database of information that is personalized to the caller, and the ability to convert both the caller's personalized input into a request that is understandable by the database software, as well as the ability to convert the information retrieved from the database into an audible signal that will be understood by the caller. FIGS. 4 and 5 depict an exemplary system using an IVR as well as an exemplary call flow depicting information that is typically requested using an IVR.

For example, many customers dialing into a bank will want to know their current balance. As before, a call from Remote Terminal 100 may be routed over PSTN 110 to PBX 155. For example, a user at Remote Terminal 100 may have dialed "1-555-ACME SIX." When PBX 155 receives the call, it may be programmed to connect the call initially over Line 162 to Automatic Call Distributor (ACD) 445, which may further be programmed to connect the call to IVR 440. Although ACD 445 is depicted as connected to IVR 440, and the CSR stations 471, 472, and 479 are depicted as connected to PBX 155, ACD 445 may also be directly connected to IVR 440 and CSR stations 471, 472, and 479.

When Voice Node 444 receives the call, it may, under the control of Control Node 442, provide an audible message or prompt to the caller. In FIG. 5, steps 505 and 510 indicate this process. In response to caller input, illustrated at step 515, another prompt is given in step 520. "Please enter account number and PIN." In response to further input, IVR 440, as illustrated in FIG. 4, may be connected to access Customer Database 190 in order to retrieve information that is personal to the caller—such as account balance. Thereafter, as depicted by step 530 in FIG. 5, IVR 440 is programmed to create an audible message to the caller reciting the balance on record.

While a live bank teller can respond to a customer's request and tell the customer his current balance over the phone, an IVR system, as illustrated above, can automate such a task. For example, an IVR system might prompt the caller to enter his account number and some identifying information for security purposes (such as a pass code), to access a database and convert the retrieved information into an audible sentence that can be sent to the caller over the telephone line. For personalized services the IVR cannot accommodate, the system may route a caller to a live customer service representative.

A call center that anticipates many phone calls and that relies on IVRs to handle redundant personalized requests will generally require many duplicated IVR systems and many live customer service representatives in order to handle all the anticipated call volume. In such large-scale environments, call center managers will generally be concerned about certain indicia of efficient resource allocation. For example, the salary of live customer service representatives represents one of the larger overhead costs associated with call centers. Consequently, for efficient resource allocation, there is pressure to reduce this cost, such as maintaining fewer live customer service representatives, and automating as many tasks as possible through IVRs and Automated Attendants. In this regard, an indicator of the efficient use of live customer service representatives is the ratio of the number of customers that get the information they desire from the IVR system to the number of customers routed to live customer service representatives in order to get the personalized information they might be after. Another indicator, of course, is the average amount of time that a caller wishing to speak to a representative spends on hold.

While the average amount of time that a caller wishing to speak to a representative spends on hold will be affected by the number of live customer service representatives available, it is also affected in large measure by how "caller-friendly" the call flow is. For example, if a call flow is too confusing or requires too many DTMF entries to arrive at a frequently requested option, many callers will simply "zero-out" to speak to a live customer service representative. This decreases the ratio of callers that end the call within the IVR, and increasing the "hold time" as well as the number of live customer service representatives that would be necessary to decrease that time. Moreover, if it is easy for callers to take their business elsewhere, and a competitor happens to provides more caller-friendly service, then an unfriendly call-flow can also result in the loss of business.

Because of the importance that small adjustments to call flow can make in efficient and friendly customer experience, and because the personalized service that each business or situation offers is often unique to that business or situation, there is often a need to continually adjust call flow parameters to achieve an efficient and friendly customer-service experience.

For this reason, Automated Attendant systems connected or integrated in PBXs may be configured to provide reporting information to the call center manager to give the call center manager an idea of the progress of calls through the Automated Attendant system. This reporting information may consist of a sessionid, which is a unique identifier assigned to each call handled by the Automated Attendant system, as well as information that reflects the caller's progress through the call flow. Based upon a review of the caller's progress through a call flow, a call center manager may wish to make a slight adjustment to the call flow to more efficiently manage incoming calls.

Especially in businesses which anticipate a large number of callers with a large number of personalized requests, such minor adjustments to call flow can have the largest impact, and the need to continually tailor the call flow in reaction to system upgrades, improvements in call handling, interaction, management, processing, or routing is perhaps greatest. It is in exactly this scenario, however, where a call center manager encounters the problems associated with adjusting a large number of IVR systems operating in parallel. Such changes incur their own cost on the system and on the customer experience. It is often necessary to stage such overall changes to the IVR systems, anticipating that some systems will go down as a result for unforeseen reasons. All of this, again, can simply result in more callers getting disconnected, put on hold, etc.

SUMMARY

Both the foregoing general description and the following detailed description are exemplary and explanatory only and do not restrict the claimed subject matter.

A system for managing multiple telephone calls consistent with one aspect of the disclosure comprises an automated attendant apparatus for receiving a call from a user; a plurality of rules for amending a session record associated with the call to reflect a plurality of instructed actions; and an interpreter for evaluating an amended session record to derive one of the plurality of instructed actions, where the automated attendant apparatus is configured to implement the derived action.

A method for managing multiple telephone calls consistently comprises receiving a plurality of calls from users on a plurality of automated attendant apparatus; sending a plurality of session values associated with the plurality of calls to a controller over a network; amending one of the plurality of session values according to one of a plurality of rules under the control of the controller to reflect a corresponding instructed action; evaluating an amended session record to derive an instructed action; and implementing at least one of the plurality of instructed actions under the control of one of the plurality of automated attendant apparatus.

BRIEF DESCRIPTION OF THE DRAWINGS

The accompanying drawings, which are incorporated in and constitute a part of this specification, illustrate embodiments of the disclosure and together with the description, serve to explain the principles of the disclosure. In the drawings

FIG. 2 depicts a call flow that may be implemented by the system of FIG. 1;

FIGS. 6-1 and 6-2 depict a system consistent with one aspect of the present disclosure;

FIG. 10 depicts an exemplary Call Log Detail Table consistent with one aspect of the disclosure;

FIG. 11 depicts an exemplary Call Log Master Table consistent with one aspect of the disclosure; and FIG. 12 depicts a Call Flow Detail Table consistent with one aspect of the disclosure.

DETAILED DESCRIPTION

Reference will now be made in detail to exemplary embodiments of the disclosure, examples of which are illustrated in the accompanying drawings. Wherever possible, the same reference numbers throughout the drawings refer to the same or like parts.

Figure 1:
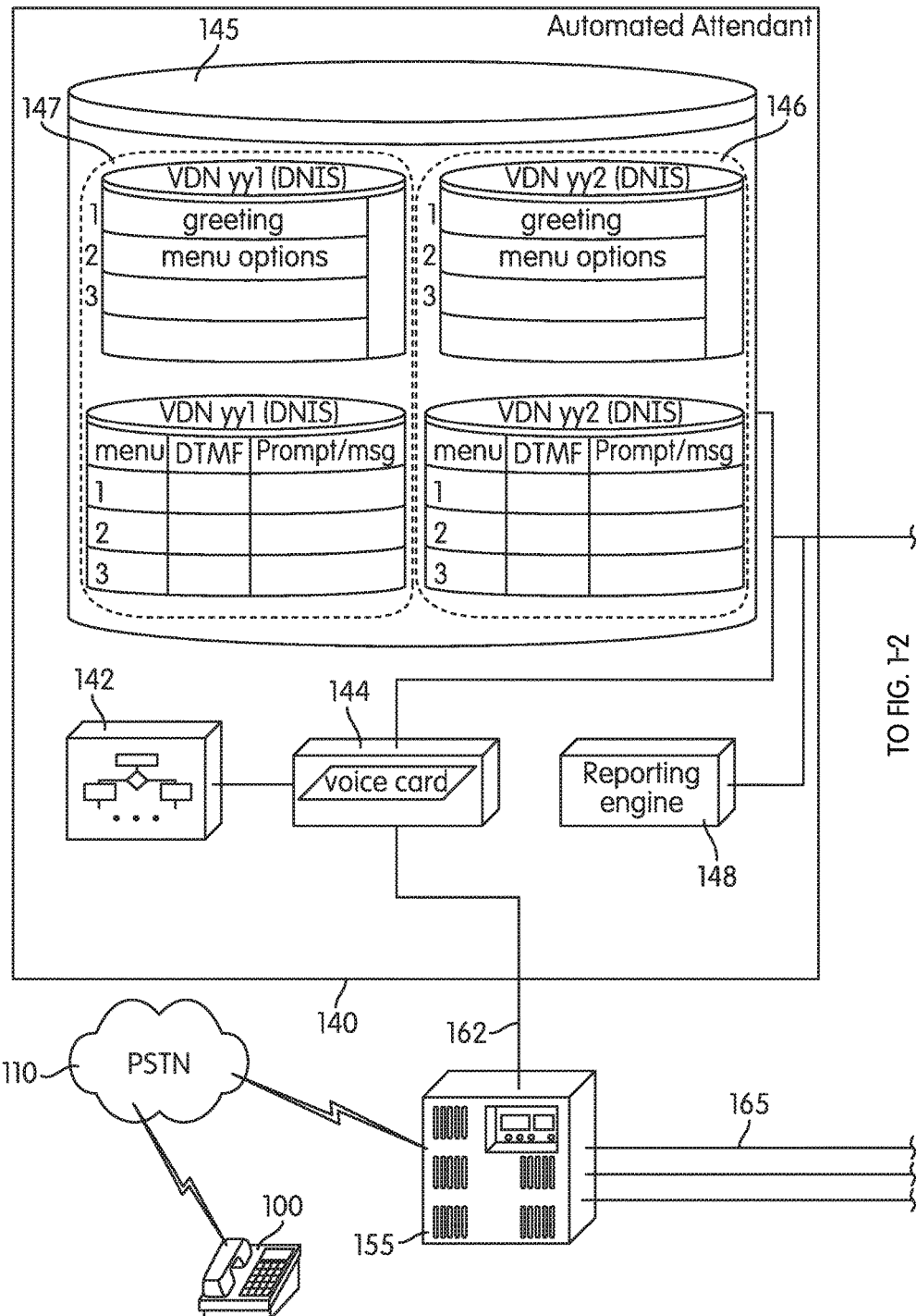
FIGS. 1-1 and 1-2 depict a prior-art Automated Attendant system.
Figures 1, 2:
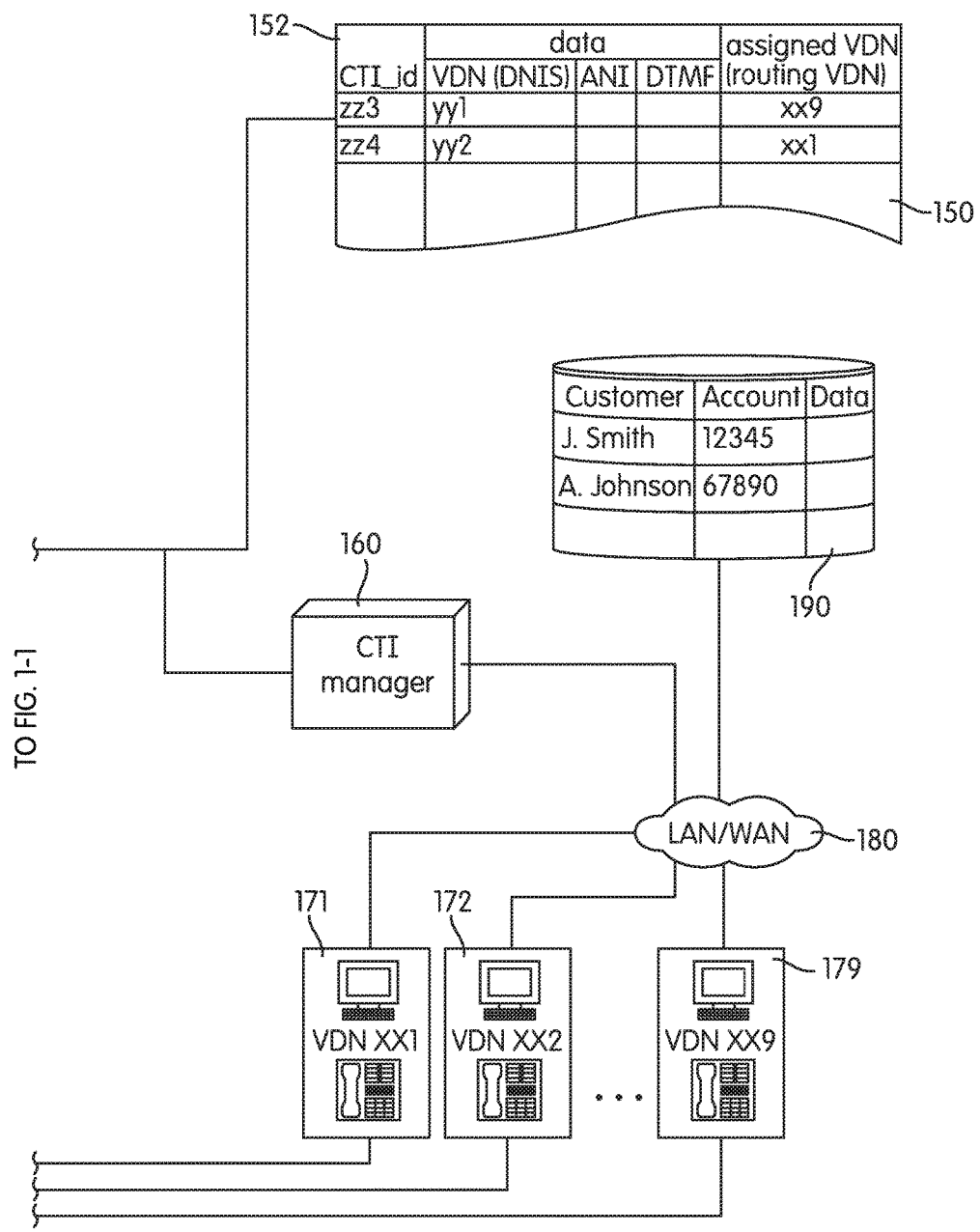
Figure 2:
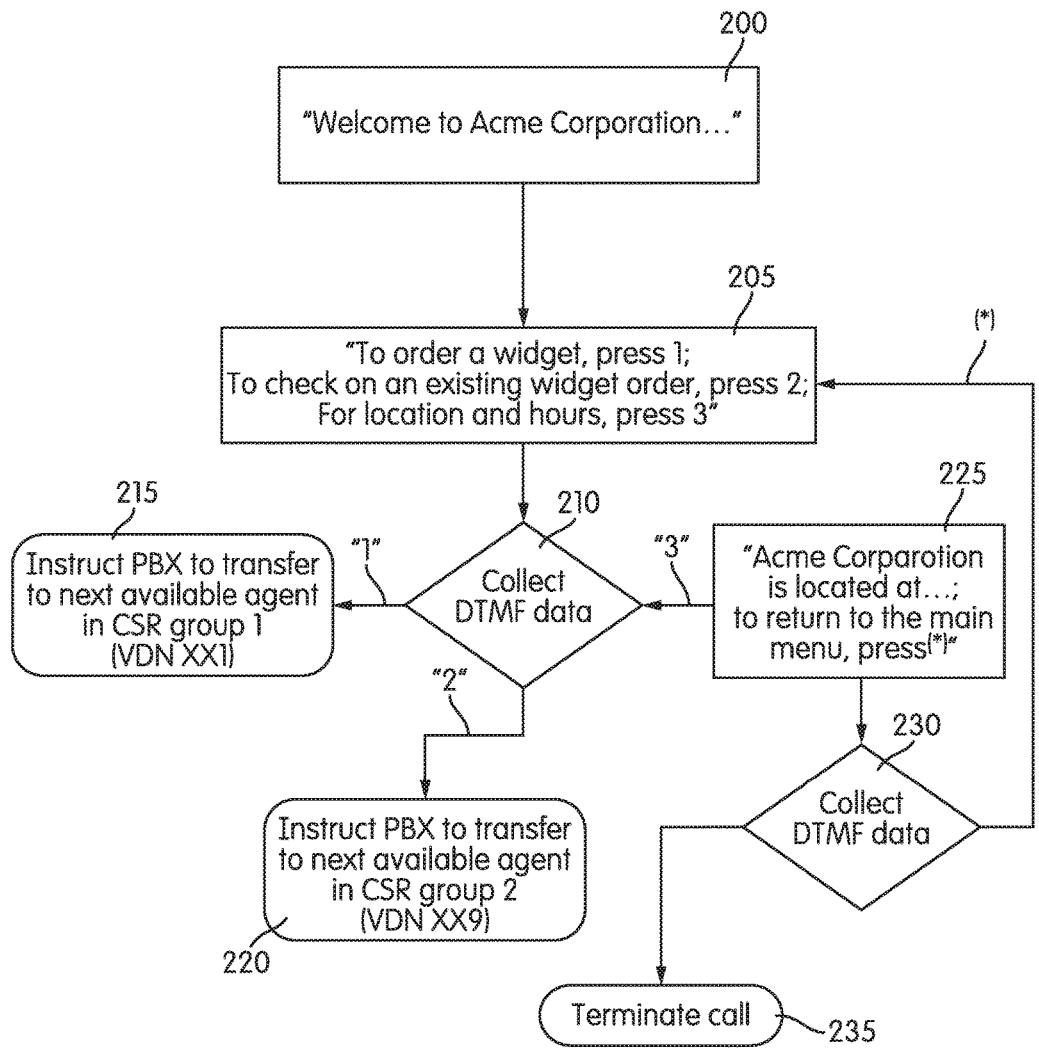
Figure 3:
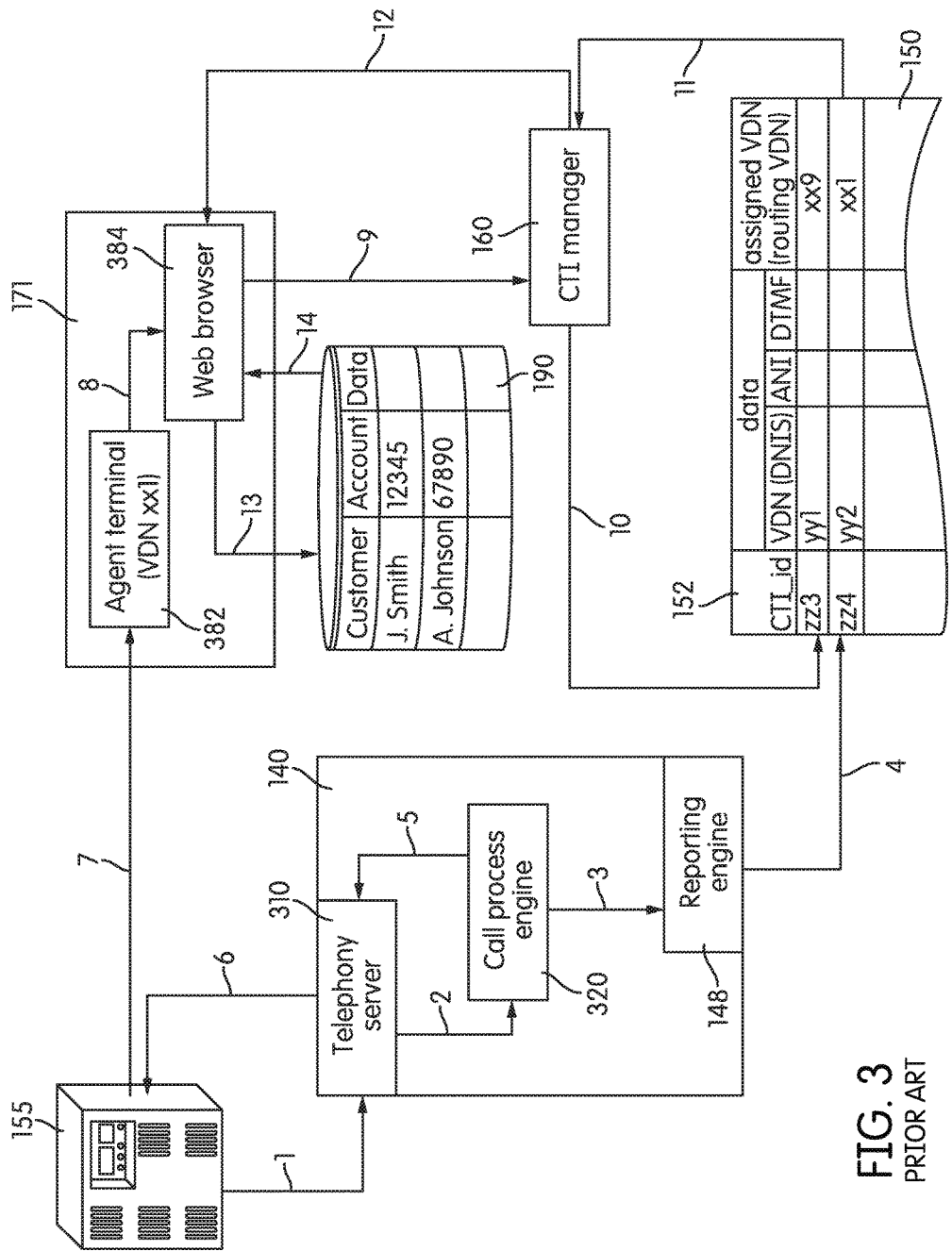
FIG. 3 depicts a process flow that may be implemented by the system of FIG. 1.
Figure 4:
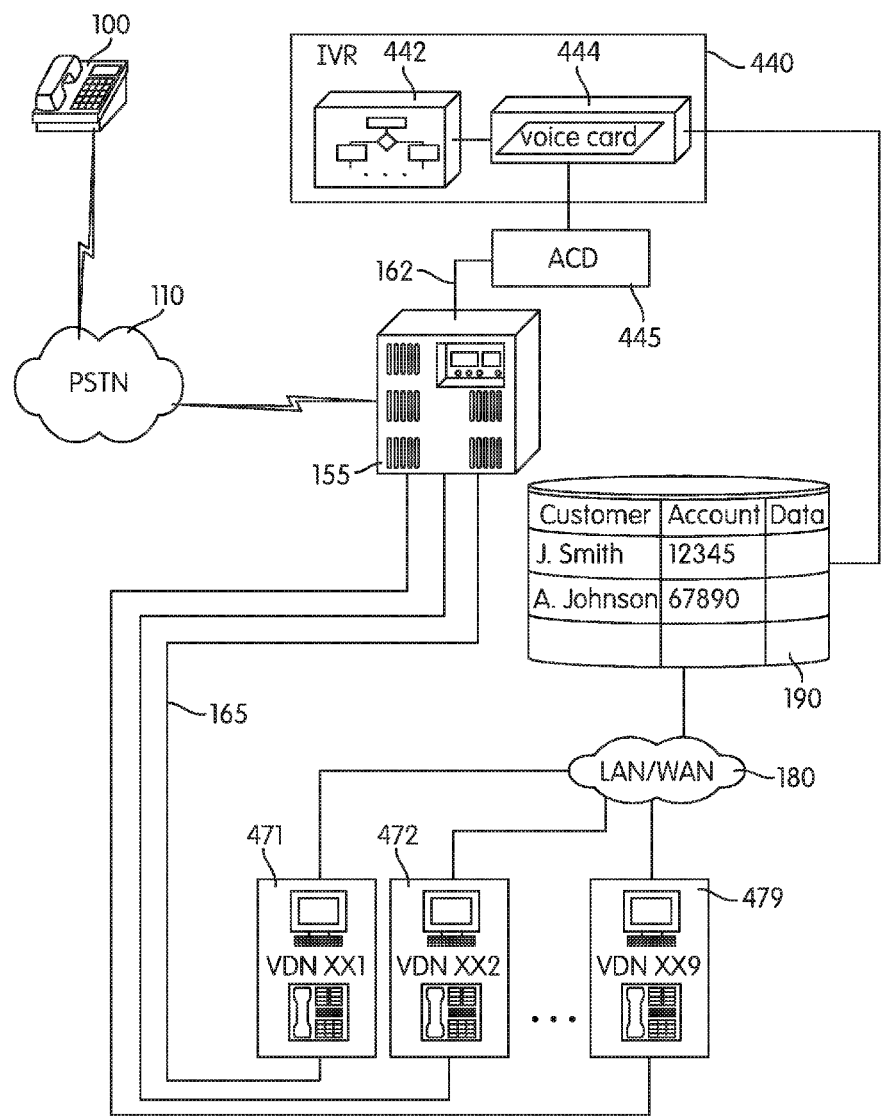
FIG. 4 depicts an exemplary prior-art IVR system.
Figure 5:
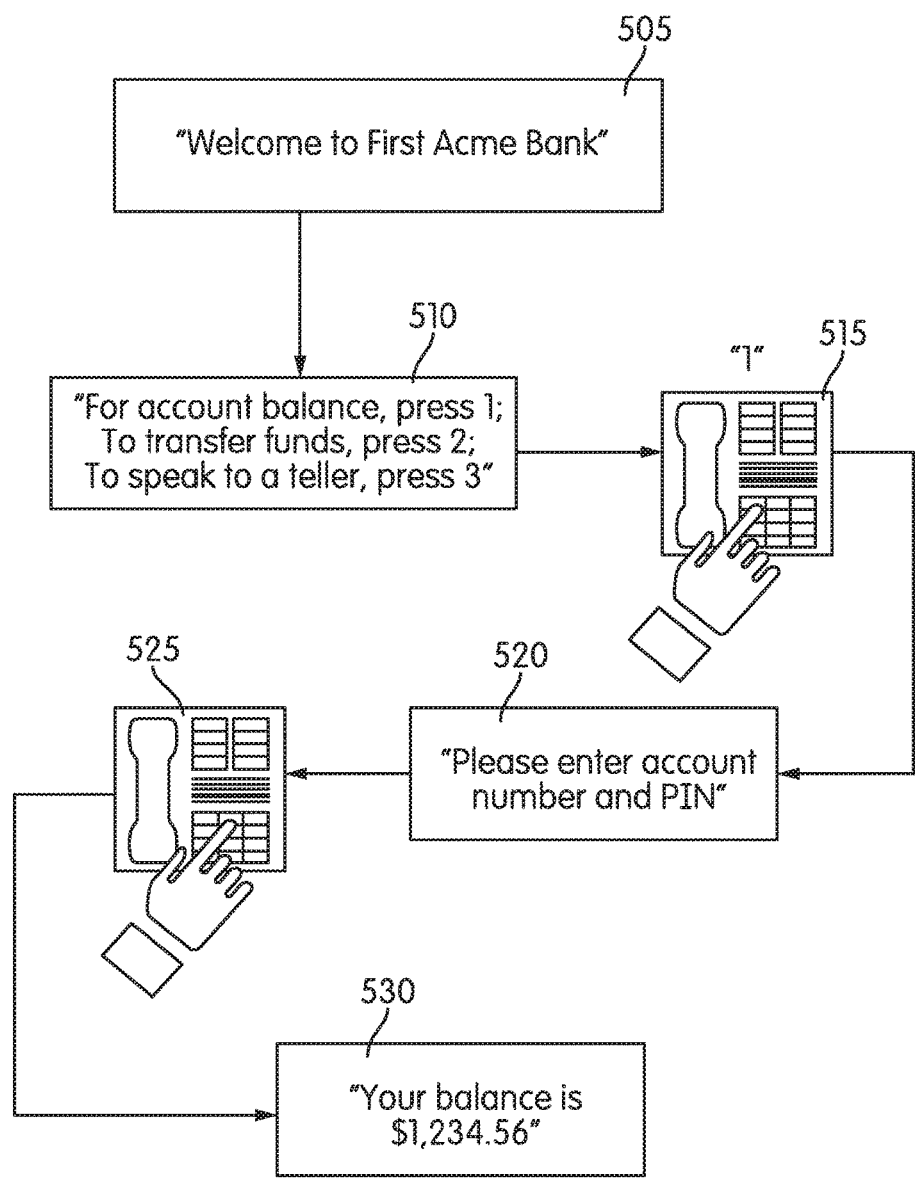
FIG. 5 depicts a call flow that may be implemented by the system of FIG. 4.
Figures 1, 6:
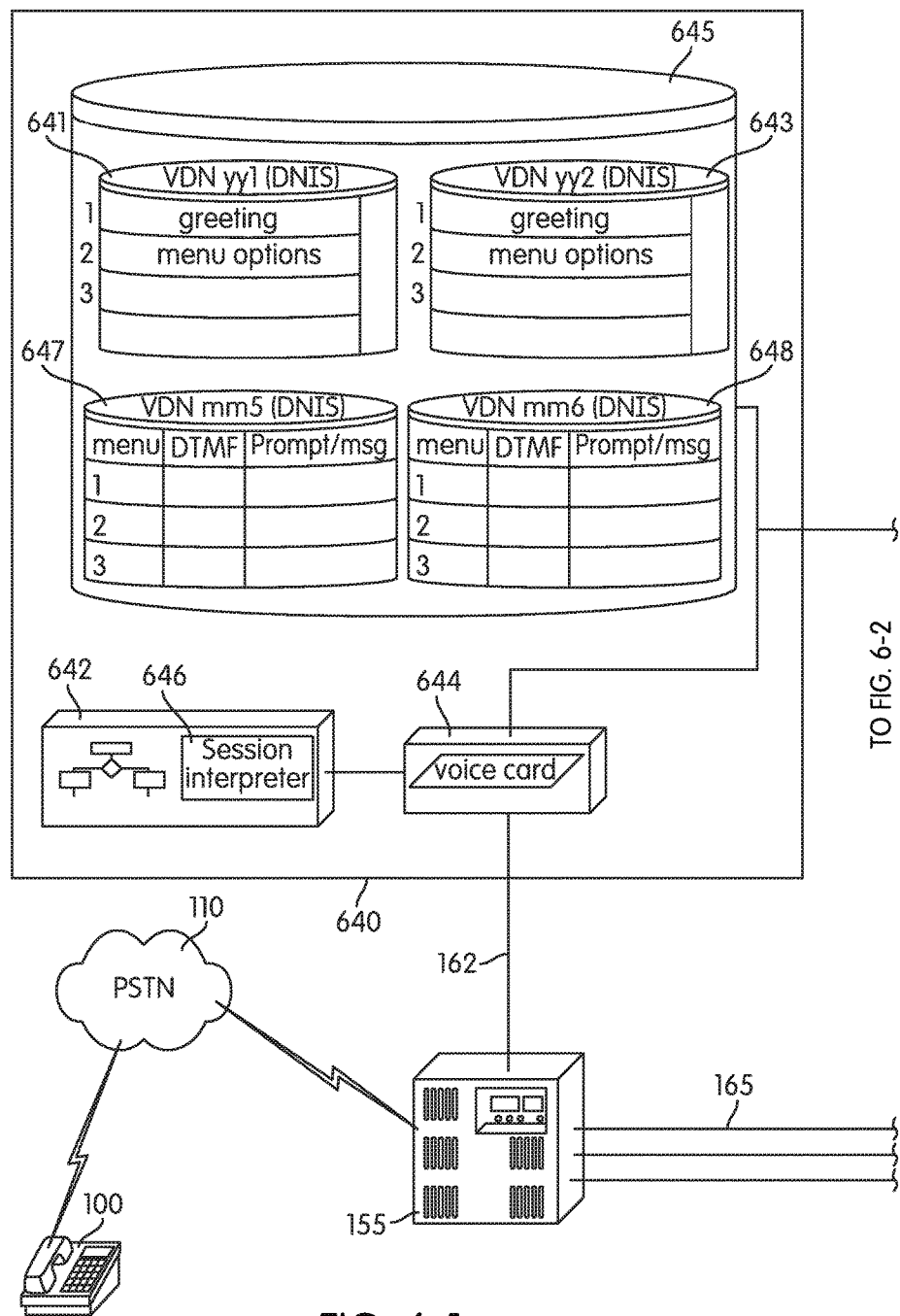
Figures 2, 6:
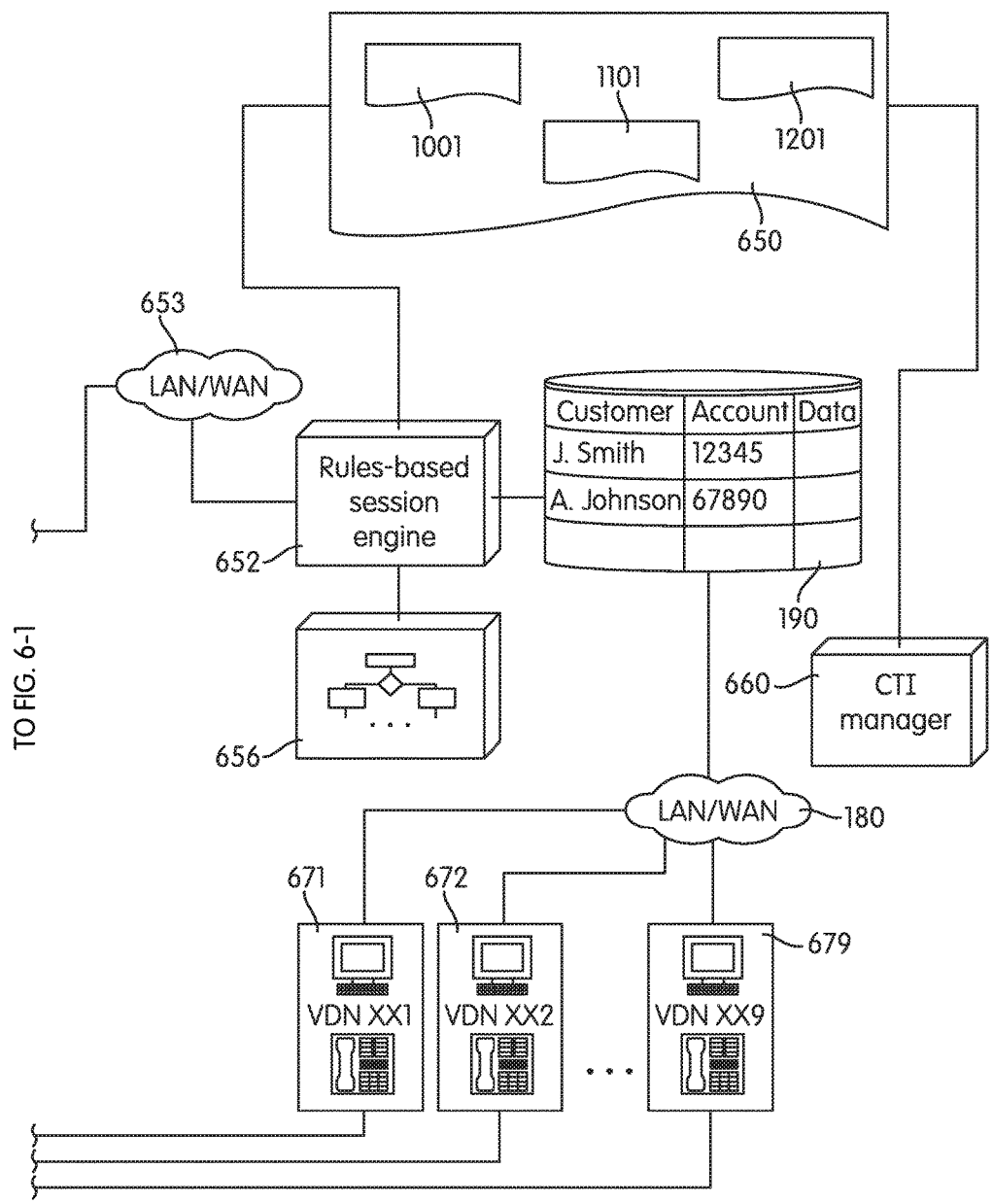

FIGS. 6-1 and 6-2 (collectively FIG. 6) is a diagram of a system consistent with one aspect of the present disclosure. A Remote Terminal 100 is connected through PSTN 110 to PBX 155. Any switch that provides the functionality of PBX 155 may be used, however. For example, PBX 155 may include the S8500/S8700 Media Server from AVAYA.

PBX 155 is connected to CSR stations 671, 672, and 679 through lines 165. In a preferred embodiment, lines 165 correspond to IP or digital connections.

Although depicted as connected over line 162, the voice and processing functionality of Automated Attendant system 640 may be embodied or integrated within PBX 155, such as is the case with the S8500/S8700 Media Server from AVAYA.

Voice Node 644 and Control Node 642 are connected to database 645, which includes the prompts, messages, and other information. As with Database 145 (FIG. 1), Database 645 in FIG. 6 includes subsets of data associated with particular VDNs. For example, a call accessing PBX 155 over PSTN 110 using the number 1-555-SAMPLE1 may have an associated DNIS that is mapped onto DNIS/VDN yy1, and the greeting heard by the caller may be pulled from Data Set 641 by Control Node 642 and Voice Node 644. Likewise, a call accessing PBX 155 over PSTN 110 using the number 1-555-SAMPLE2 may have an associated DNIS that is mapped onto DNIS/VDN yy2, and the greeting heard by the caller in this instance may be pulled from Data Set 643 by Control Node 642 and Voice Node 644. In addition to assigning different data sets to different DNIS/VDNs, Database 645 includes data sets corresponding to particular menu choices ("menu VDNs"), and Control Node 642 includes Session Interpreter 646, both of which will be described in more detail below.

Furthermore, Automated Attendant system 640 is connected to Rules-Based Session Engine 652 and Control Node 656 over Network 653. Network 653, in a preferred embodiment, will be an IP network that may use a communication device or layer (e.g., CVLAN) running, for example, on a Linux server.

Rules-Based Session Engine 652 and control Node 656 may also include an Advanced Segmentation product from AVAYA. One type of rules-based system connected to a PBX is also disclosed in U.S. Pat. No. 6,292,550 to Burritt, assigned on its face to AVAYA. Consistent with one aspect of the present disclosure, Rules-Based Session Engine 653 and Control Node 656 access Relational Database Set 650 and may also be configured to access Customer Database 190. Relational Database Set 650 may include data sets that are updated during the course of a caller's interaction with the system of FIG. 6, as well as data sets that define the rules under which Rules-based Session Engine 652 and Control Node 656 operate.

As before, CTI Manager 660 may be configured to operate in conjunction with CSR Stations 671, 672, and 679 to access Customer Database 190, as well as pull relevant information from Relational Database Set 650.

In one aspect of the disclosure, Relational Database Set 650 may include Call Log Detail Table 1001, Call Log Master Table 1101, and Call Flow Detail Table 1201. Examples of Call Log Detail Table 1001, Call Log Master Table 1101, and Call Flow Detail Table 1201 are depicted, respectively, in FIGS. 10, 11, and 12, and described in more detail below.

Figure 7:
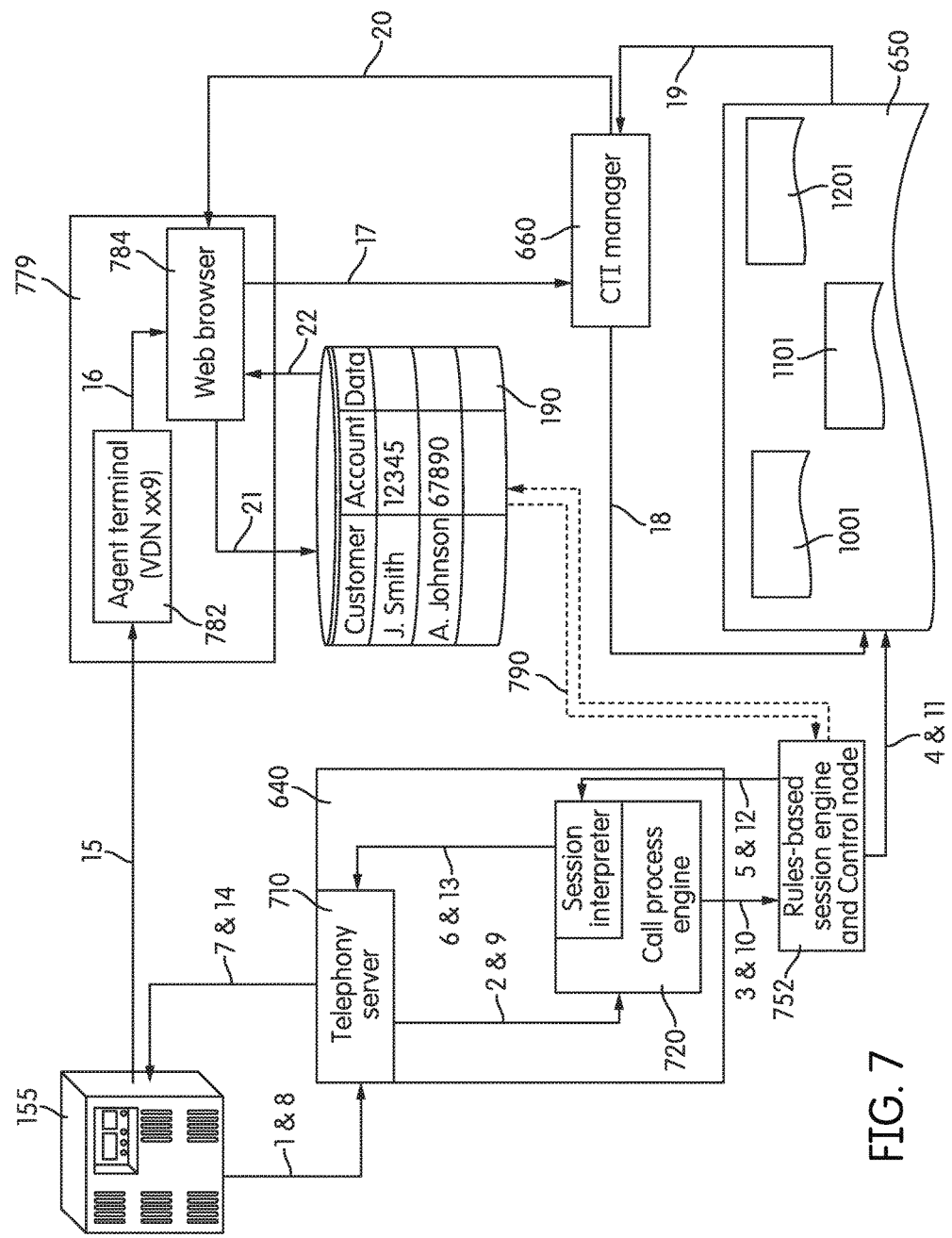
FIG. 7 depicts a process flow consistent with one aspect of the present disclosure.

FIG. 7 depicts an exemplary process that the system in FIG. 6 can follow consistent with one aspect of the present disclosure. The numbers "1," "2," "3," "4," etc. in FIG. 7 indicate the order in which the exemplary process may be executed.

As before, with reference to FIG. 6, a call from Remote Terminal 100 may be routed over PSTN 110 to PBX 155. For example, a user at Remote Terminal 100 may have dialed "1-555-SAMPLE2." When PBX 155 receives the call, it may be programmed to connect the call initially over Line 162 to Automated Attendant system 640 and may map the call to VDN yy2.

With reference to FIG. 6 again, when Voice Node 644 receives the call with the associated VDN number, it may, under the control of Control Node 642, provide an audible message or prompt to the caller. Consistent with one aspect of the disclosure, however, control of the call flow is subsequently handed off to the Rules-based session engine 652 and Control node 656, which are external to Automated Attendant System 640 over network 653. To manage the call over network 653, a unique identifier is created and stored in a session record stored in Relational Database Set 650. This unique identifier is subsequently used to refer and keep track of the call as control is handed off between Control Node 642 within Automated Attendant System 640, and Control Node 656 external to Automated Attendant System 640.

The process described above in which a user dials "1-555-SAMPLE2," and a unique identifier, written to Relational Database Set 650, is tracked is also represented in FIG. 7, by the lines labeled "1-7" flowing from PBX 155 to Telephony Server 710 contained within Automated Attendant system 640, between Telephony Server 710 and Call Process Engine 720, between Call Process Engine 720 and Rules-Based Session Engine and Control Node 752, and between Rules-Based Session Engine and Control Node 752 and Relational Database Set 650. In FIG. 7, one skilled in the art should appreciate that Telephony Server 710 and Call Process Engine 720 represent functional modules. Such modules are depicted in this manner merely to schematically isolate functions that are performed by the combination, depicted in FIG. 6, of Voice Node 644, Control Node 642, and Database 645 in Automated Attendant system 640. Such processes and functions may include a general greeting and a general introduction to certain menu options, the capture of a DTMF signal, the determination as to what extension (or VDN) PBX 155 should route the call to, etc., based upon internal vectoring logic.

Figure 8:
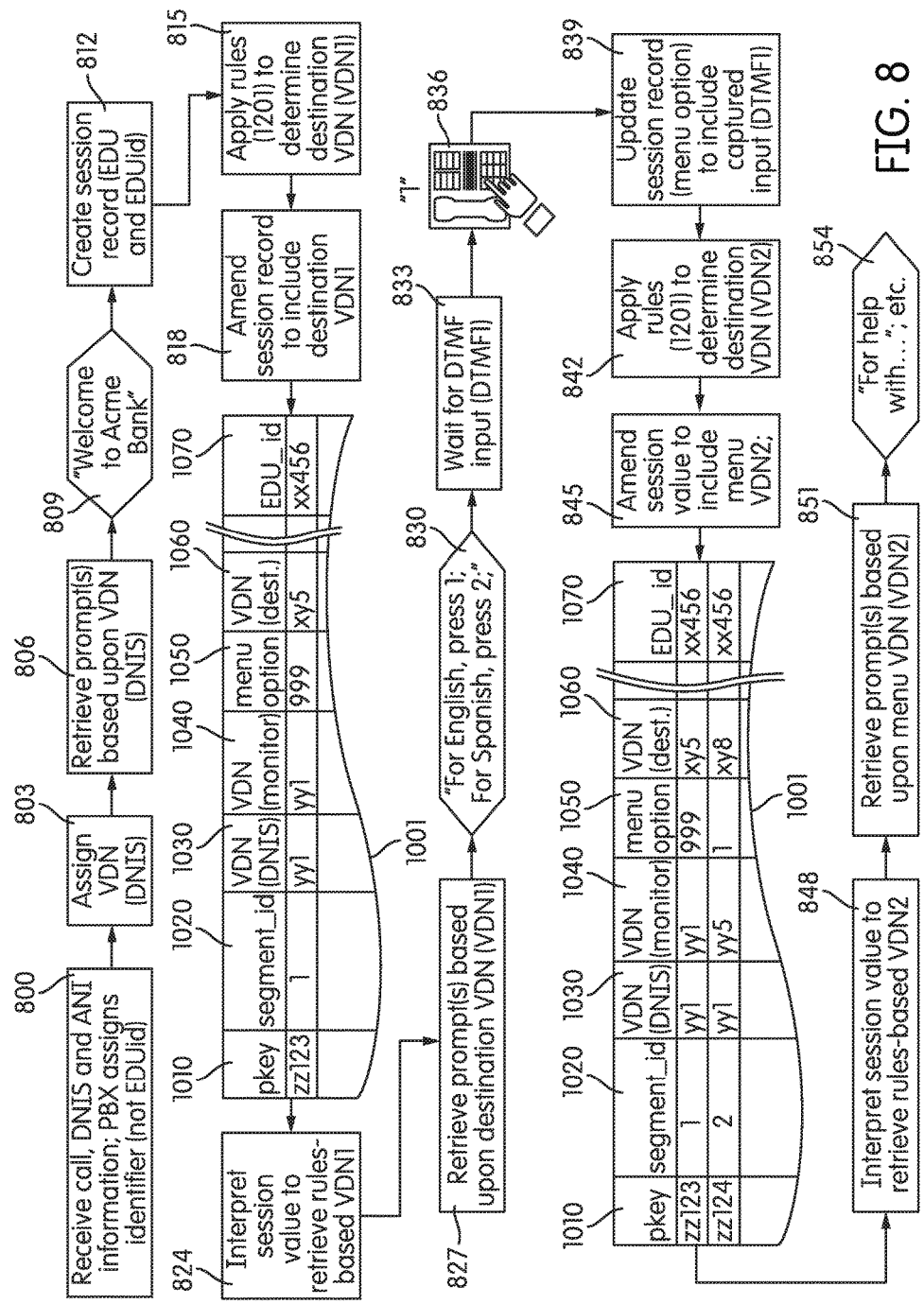
FIG. 8 depicts a sequence of steps that the system of FIG. 6 may perform consistent with the present disclosure.

An exemplary process consistent with one aspect of the disclosure is further illustrated in FIG. 8, such as the capture of the caller DNIS and ANI information and the creation of a unique identifier external to Automated Attendant System 640 (step 812).

Specifically, step 800 depicts a call being received by Automated Attendant System 640, and, based on the DNIS received from PSTN 110, a "VDN (DNIS)" is assigned (step 803). For example VDN (DNIS) may be assigned the value "yy1." Automated Attendant System 640, through Control Node 642, retrieves the greeting associated with VDN (DNIS) "yy1" (step 806), and plays it to the caller "Welcome to Acme Bank" (step 809).

Consistent with one aspect of the disclosure, the VDN yy1 routes to a vector that makes an adjunct route request outside of Automated Attendant System 640 to Rules-based session engine and Control node 752, which requests the creation of a session record for tracking the call and a unique identifier. One skilled in the art should appreciate, for example, that the session record may include a primary key correlated with a unique identifier that is used to reference the call throughout the systems. For example, the session record may contain Time and Date statistics, an IP Address, port identification, unique call identifiers, DNIS, ANI, and values captured based on the users' input selections. An example of such a record is an Electronic Data Unit (EDU) as described, for example, in U.S. Pat. No. 6,934,381 to Klein et al, and assigned on its face to Avaya Technology Corp. Each EDU record (or format) has an associated unique identifier ("eduid"), which may be formed by the concatenation of the UNIX time the EDU record was created (in hexadecimal format) with other unique identification, i.e: 424074b9000000000a3c350e23300002. When called by its EDUid, the EDU record (or format) may contain much of the information referred to above, such as: Time and Date statistics, an IP Address, port identification, unique call identifiers, DNIS, ANI, values captured based on the users' input selections, etc.

The creation of a session record (EDU and EDUid) is depicted in step 812. In addition, the Rules-based session engine and Control node 752 are notified that a new call has arrived.

The rules-based session engine and Control node 752 access Call Flow Detail Table 1201 in Relational Database Set 650. An exemplary Call Flow Detail Table 1201 is depicted in FIG. 12. Based upon the VDN (DNIS) 1030 (such as "yy1"), the last VDN utilized (VDN (monitor) 1040 in FIG. 12), and the last selected menu option (menu option 1050 in FIG. 12), a destination VDN is assigned (VDN (dest.) 1060 in FIG. 12).

In FIG. 12, for example, and following the example illustrated in FIG. 8, a situation where the VDN (DNIS) 1030 is "yy1," where the last VDN utilized (VDN (monitor) 1040) is also "yy1," and where there has been no menu selection yet (menu option 1050="999"), Call Flow Detail Table 1201 returns a VDN (dest.) 1060 of "xy5."

The destination VDN "xy5" is then written to the session record contained in Call Log Detail Table 1001, shown in FIG. 8 after step 818, and also depicted in more detail in FIG. 10. Call Log Detail Table 1001 includes, among other information, EDUid 1070. Consequently, Call Log Detail Table 1001 may be later analyzed to determine the exact sequence that the call associated with EDU_id "xx456," for example, took as the caller interacted with the system of FIG. 6.

The destination VDN (VDN (dest) 1060) is delivered to Automated Attendant System 640, to access a vector and present the appropriate menu options to the caller. According to the example illustrated in FIG. 8, the destination VDN associated with "xy5" presents a prompt to select English ("1") or Spanish ("2") (step 830). Again, consistent with one aspect of the disclosure, the destination VDN (VDN (dest) 1060) makes an adjunct route request outside of Automated Attendant System 640 to Rules-based session engine and Control node 752, beginning yet another cycle between Automated Attendant System 640, Rules-based session engine and Control node 752, and Relational Database Set 650. As depicted following step 836, the VDN (DNIS) 1030 is still "yy1," the VDN (monitor) 1040, however, is now "xy5," and menu option 1050 is "1" (for English).

Based upon Call Flow Detail Table 1201, such values return a destination VDN (VDN (dest) 1060) of "xy8." A new session record is written to Call Log Detail 1001 (with segment_id 1020, for example, incrementing to "2"), and destination VDN "xy8" is returned to Automated Attendant System 640.

In this way, each transaction identified by the EDU_id 1070, VDN (DNIS) 1030, VDN (monitor) 1040, menu option 1050, etc. is logged into Call Log Detail Table 1001 as an individual transaction.

The process described above repeats until the call is either terminated or the last VDN describes the final exit point in the call f low detail. Call Log Master Table 1101 may be populated at the end of the call when the call is transferred from Automated Attendant System 640 to another site.

For exemplary purposes only, FIG. 10 depicts several individual transactions logged, and involving at least two separate EDU_id 1070 values "xx456" and "xx378." As just indicated, Call Log Detail Table 1001 may be analyzed after the call is transferred out of the Automated Attendant System 640 to produce a table such as the Call Log Master Table 1101, depicted in FIG. 11.

In Call Log Master Table 1101, one may include as much or as little of the information about a call identified by EDU_id 1070 as one likes. For exemplary purposes only, the table depicted in FIG. 11 includes ANI, DNIS, the last VDN associated with the call before it exited the system, as well as all of the menu options selected by the caller, in sequence. Such a record, for example, may be accessed by CTI manager 660 if the call is transferred to a CSR station so that the representative is able to view the callers precise journey though the automated system.

In another embodiment of the disclosure, Rules-based session engine and Control node 752 are configured to access customer database 190 as part of the rules associated with determining the call flow. In this way, Automated Attendant System 640 may be configured to respond more like an IVR by providing particular information that may be personal to a caller. For example, a caller may be prompted to enter "PIN" data, which may then be passed as a "menu option" string to the Rules-based session engine and Control node 752, and which then may be easily validated against information stored in customer database 190. In the above embodiment, certain confidential or protected information is exchanged between Automated Attendant system 640 and Rules-Based Session Engine 652 and Control Node 656. Consequently, in practice, it may be useful, but not necessary, to include some form of encryption of this data over network 653. This may be realized, for example, through the use of public key cryptography, or some other robust encryption scheme that may be implemented, for example, in Session Interpreter 646 and Control Node 656, or otherwise.

In another embodiment of the present disclosure, Session Interpreter 646 may be configured to provide special handling with certain VDN (dest.) 1060 values that may be delivered. In this regard, Session Intepreter 646 is capable of implementing particular functions based upon the workflow design, thereby enabling a plurality of VDN values in the PBX. This is illustrated in FIG. 7 by the process line 5 running from Rules-Based Session Engine and Control Node 752 to Session Interpreter 646, contained within Call Process Engine 720. Referring to FIG. 6, Session Interpreter 646 interprets the amended session record in order that Control Node 642 and Voice Node 644 perform the steps dictated by Rules-Based Session Engine 652 and Control Node 656, as well as access the appropriate data from Database 645.

The remainder of FIG. 7 includes the process flows that may be associated with an ultimate transfer of the call to a CSR station, illustrated in process flow steps 15-22. In addition to using an Automated Attendant system to provide efficient call management in one embodiment, or personalized information, such as would be given by an IVR in another embodiment, one skilled in the art should appreciate that the system of the present disclosure allows for a seamless update or change of call process flow logic through an update of Rules-Based Session Engine 652 and Control Node 656. For example, instead of having to update several independent IVR systems, systems and methods consistent with the present disclosure allow voice response systems to be updated simply through a modification of Call Flow Detail Table 1201, an exemplary illustration of which is depicted in FIG. 12. Call Flow Detail Table 1201 may be located remote from Automated Attendant systems 640, but an update or modification of Call Flow Detail Table 1201 is all that is required to update a plurality of remotely located Automated Attendant systems 640.

Figure 9:
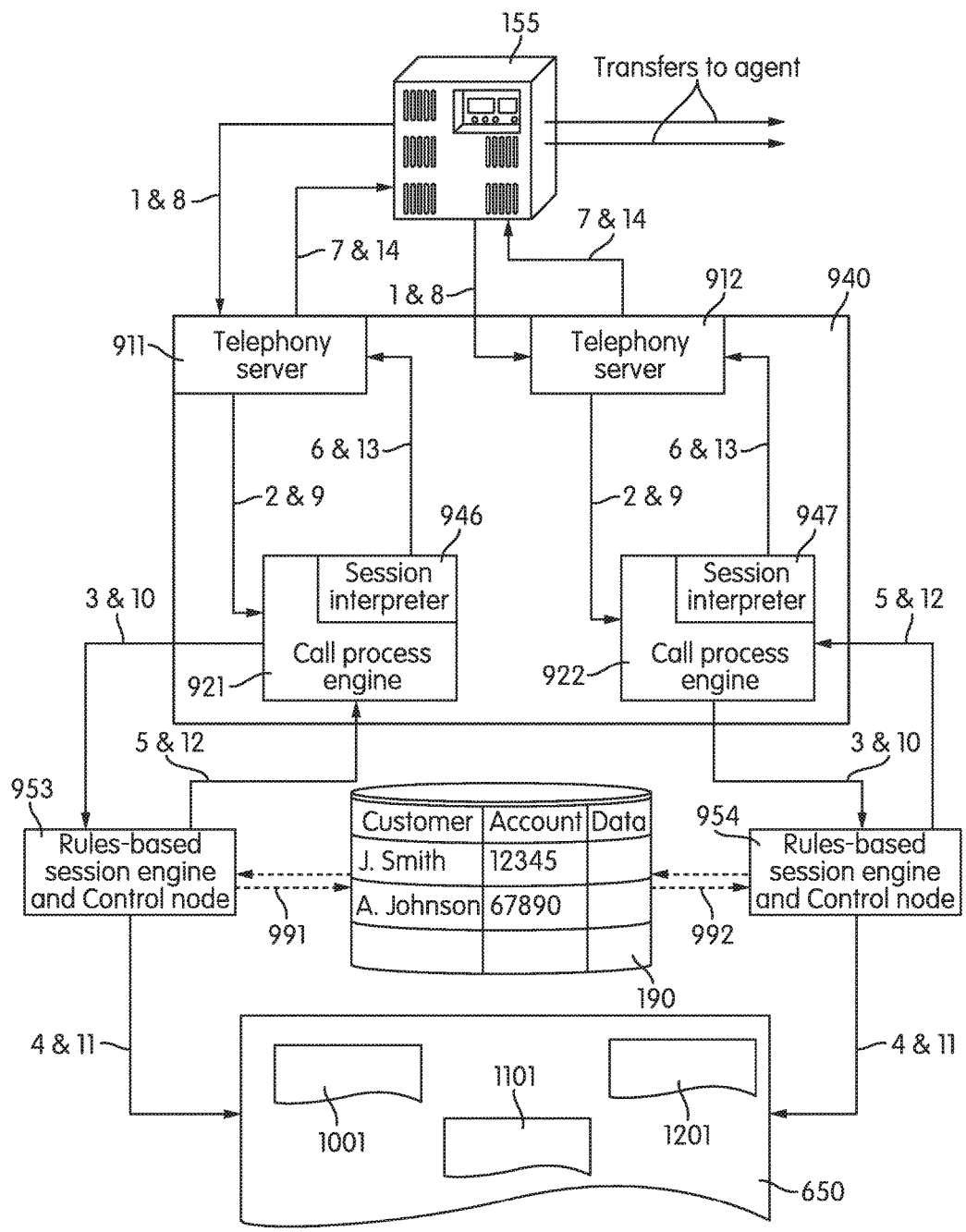
FIG. 9 depicts another process flow that may be realized by the system of FIG. 6.

Moreover, as illustrated in FIG. 9, a system consistent with the present disclosure allows for the parallel and asynchronous processing of calls by parallel instances of Rules-based session engine and Control node 953 and 954. With the improvement in processing architecture, many more calls may be processed simultaneously by Rules-based session engine, than may be conventionally processed by a series of parallel IVR systems. Multiple simultaneous IP requests consume less physical resources to process any given amount of calls vs. the traditional 1 call to 1 port IVR system.

The foregoing description of an implementation of the disclosure has been presented for purposes of illustration and description. It is not exhaustive and does not limit the disclosure to the precise form disclosed. One skilled in the art should appreciate from the foregoing description that modifications and variations are possible in light of the above teachings or may be acquired from practicing of the disclosure. For example, the steps associated with the present disclosure may be implemented as a combination of hardware and software or in hardware alone. Accordingly, the disclosure is not limited to the above-described embodiments, but instead is defined by the appended claims.

What is claimed is:

1. A system for managing telephone calls comprising:
at least one computing device configured to:
assign a first vector directory number to a call using a rules-based session engine;
create a session record for the call;
generate a unique identifier associated with the call;
store the generated unique identifier associated with the call in the session record for the call;
select, using the rules-based session engine, a call flow record from a plurality of call flow records stored at a call flow database table, the call flow record specifying the first vector directory number, a first menu option selected during the call, and a second vector directory number;
assign the second vector directory number to the call;
write the second vector directory number to the session record;

access a vector using the second vector directory number;
perform an action associated with the vector;
determine that the call is terminated; and
responsive to determining that the call is terminated, populating a call log master table.

2. The system of claim 1 further comprising:
storing the session record in a call log detail table of a relational database.

3. The system of claim 2 wherein:
the session record of the call log detail table comprises the unique identifier, a segment identifier, a vector directory number selected based on a Dialed Number Information Service (DNIS) number, a previously selected menu option, and a destination vector directory number.

4. The system of claim 1, further comprising:
storing a plurality of rule records for routing the call in a call flow detail table of a relational database.

5. The system of claim 4, wherein:
each rule record in the call flow detail table comprises a vector directory number selected based on a Dialed Number Information Service (DNIS) number, a previously selected menu option, and a destination vector directory number.

6. The system of claim 4, further comprising:
modifying call process flow logic by updating at least one of the plurality of rule records stored in the call flow detail table.

7. The system of claim 4, wherein:
the call flow detail table is located remotely relative to the computing device.

8. The system of claim 1, wherein:
the call is one of a plurality of calls received concurrently at the computing device; and
the rules-based session engine is one of a plurality of rules-based session engines operating in parallel; and
wherein each rules-based session engine handles one of the plurality of calls.

9. The system of claim 1, wherein:
the action comprises at least one of:
  playing a message during the call,
  presenting a plurality of menu options available for selection during the call,
  prompting for selection of one of the plurality of menu options,
  receiving a selection of one of the plurality of menu options,
  receiving information entered during the call, and
  routing the call to an extension.

10. The system of claim 1 wherein:
the rules-based session engine is located remotely relative to the computing device.

11. A method, comprising:
assigning a first vector directory number to a call using a rules-based session engine;
creating, by a computing device, a session record for the call;
generating, by the computing device, a unique identifier associated with the call;
storing, by the computing device, the generated unique identifier associated with the call in the session record for the call;
selecting, by the computing device and using the rules-based session engine, a call flow record from a plurality of call flow records stored at a call flow database table, the call flow record specifying the first vector directory number, a first menu option selected during the call, and a second vector directory number;
assigning, by the computing device, the second vector directory number to the call;
writing, by the computing device, the second vector directory number to the session record;
accessing, by the computing device, a vector using the second vector directory number;
performing, by the computing device, an action associated with the vector;
determining, by the computing device, that the call is terminated; and
responsive to determining that the call is terminated, populating, by the computing device, a call log master table.

12. The method of claim 11, further comprising:
storing the session record in a call log detail table of a relational database.

13. The method of claim 12, wherein:
the session record of the call log detail table comprises the unique identifier, a segment identifier, a vector directory number selected based on a Dialed Number Information Service (DNIS) number, a previously selected menu option, and a destination vector directory number.

14. The method of claim 11, further comprising:
storing a plurality of rule records for routing the call in a call flow detail table of a relational database.

15. The method of claim 14, wherein:
each rule record in the call flow detail table comprises a vector directory number selected based on a Dialed Number Information Service (DNIS) number, a previously selected menu option, and a destination vector directory number.

16. The method of claim 14, further comprising:
modifying call process flow logic by updating at least one of the plurality of rule records stored in the call flow detail table.

17. The method of claim 14, wherein:
the call flow detail table is located remotely relative to the computing device.

18. The method of claim 11, wherein:
the call is one of a plurality of calls received concurrently at the computing device; and
the rules-based session engine is one of a plurality of rules-based session engines operating in parallel; and
wherein each rules-based session engine handles one of the plurality of calls.

19. The method of claim 11, wherein:
the action comprises at least one of:
  playing a message during the call,
  presenting a plurality of menu options available for selection during the call,
  prompting for selection of one of the plurality of menu options,
  receiving a selection of one of the plurality of menu options,
  receiving information entered during the call, and
  routing the call to an extension.

20. The method of claim 11, wherein:
the rules-based session engine is located remotely relative to the computing device.

* * * * *